(12) United States Patent
Sarafianos et al.

(10) Patent No.: US 10,734,329 B2
(45) Date of Patent: Aug. 4, 2020

(54) ELECTRONIC CHIP ARCHITECTURE

(71) Applicant: STMicroelectronics (Rousset) SAS, Rousset (FR)

(72) Inventors: Alexandre Sarafianos, Pourrieres (FR); Thomas Ordas, Pourcieux (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 393 days.

(21) Appl. No.: 15/801,517

(22) Filed: Nov. 2, 2017

(65) Prior Publication Data

US 2018/0253633 A1 Sep. 6, 2018

(30) Foreign Application Priority Data

Mar. 6, 2017 (FR) ...................................... 17 51788

(51) Int. Cl.
| | | |
|---|---|---|
| *H01L 21/56* | (2006.01) | |
| *H01L 23/00* | (2006.01) | |
| *H01L 27/118* | (2006.01) | |
| *H01L 27/02* | (2006.01) | |

(52) U.S. Cl.
CPC .......... *H01L 23/576* (2013.01); *H01L 21/563* (2013.01); *H01L 27/02* (2013.01); *H01L 27/11807* (2013.01)

(58) Field of Classification Search
CPC ............ G06K 19/07381; G06F 21/755; H01L 21/563; H01L 23/576; G11C 16/22
See application file for complete search history.

(56) References Cited

U.S. PATENT DOCUMENTS

| | | | | |
|---|---|---|---|---|
| 8,510,700 | B2* | 8/2013 | Cocchi | G06F 30/394 |
| | | | | 716/121 |
| 2004/0120195 | A1* | 6/2004 | Okuda | G06K 19/073 |
| | | | | 365/200 |
| 2009/0251168 | A1* | 10/2009 | Lisart | H01L 23/576 |
| | | | | 326/8 |
| 2011/0193616 | A1* | 8/2011 | Amanuma | G06K 19/07381 |
| | | | | 327/514 |
| 2015/0135340 | A1 | 5/2015 | Weder et al. | |

FOREIGN PATENT DOCUMENTS

| | | |
|---|---|---|
| DE | 102004009622 A1 | 6/2005 |
| EP | 2369622 A1 | 8/2011 |
| EP | 2955750 A1 | 12/2015 |
| FR | 2958078 A1 | 9/2011 |
| FR | 2981783 A1 | 4/2013 |
| WO | 9724765 A1 | 7/1997 |
| WO | 2004047172 A1 | 6/2004 |

* cited by examiner

*Primary Examiner* — Changhyun Yi
(74) *Attorney, Agent, or Firm* — Slater Matsil, LLP

(57) ABSTRACT

In some embodiments, an electronic chip includes a doped semiconductor substrate of a first conductivity type, and wells of the second conductivity type on the side of the front face of the chip, in and on which wells circuit elements are formed. One or more slabs of a second conductivity type are buried under the wells and are separated from the wells. The electronic chip also includes, for each buried slab, a biasable section of the second conductivity type, which extends from the front face of the substrate to the buried slab. A first MOS transistor with a channel of the first conductivity type is disposed in the upper portion of each section, where the first transistor is an element of a flip-flop. A circuit is used for detecting a change in the logic level of one of the flip-flops.

25 Claims, 2 Drawing Sheets

ELECTRONIC CHIP ARCHITECTURE

CROSS-REFERENCE TO RELATED APPLICATIONS

This application claims priority to French Application No. 1751788, filed on Mar. 6, 2017, which application is hereby incorporated herein by reference.

TECHNICAL FIELD

The present application relates generally to electronic devices, and, in particular embodiments, to an electronic chip architecture.

BACKGROUND

Electronic chips such as the chips of bank cards contain confidential data liable to be coveted by pirates. To obtain these data, a pirate may carry out an attack by scanning the back face of the chip with laser pulses. The impact of the laser disrupts the operation of the chip, and the pirate carries out his attack by observing the consequences of these disturbances, called faults, on the activity of the circuits of the chip. To disrupt the operation of the chip, the pirate may also apply high positive or negative potentials, typically of a few tens of volts, for example of more than 50 V, by, for example, using a probe placed in contact with the back face.

SUMMARY

It would be desirable to have available electronic chips protected from this type of attack, which is called fault injection, known devices having various drawbacks and implementational difficulties.

One embodiment provides a device allowing all or some of the drawbacks described above to be mitigated.

Thus, one embodiment provides an electronic chip that includes a doped semiconductor substrate of a first conductivity type. Wells of the second conductivity type are disposed on the side of the front face of the chip, in and on which wells circuit elements are formed. One or more slabs of a second conductivity type are buried under the wells and separated from the wells. For each buried slab, a biasable section of the second conductivity type extends from the front face of the substrate to the buried slab. In the upper portion of each section, a first metal-oxide-semiconductor (MOS) transistor with a channel of the first conductivity type is disposed. The first transistor is an element of a flip-flop. A circuit (i.e., a detector) detects a change in the logic level of one of the flip-flops.

According to one embodiment, the detecting circuit is suitable for initializing the flip-flops at a first logic level, and for detecting the passage of one of the flip-flops to a second logic level.

According to one embodiment, the chip includes, in the upper portion of each section, a second MOS transistor with a channel of the first conductivity type, the second transistor being an element of an additional flip-flop, the detecting circuit furthermore being suitable for initializing the additional flip-flops at the second logic level, and for detecting the passage of one of the additional flip-flops to the first logic level.

According to one embodiment, the chip includes, in the upper portion of each section, a plurality of MOS transistors with channels of the first conductivity type, each transistor being an element of a flip-flop, the detecting circuit being suitable for detecting a change in the logic level of a majority of the flip-flops.

According to one embodiment, for each section, each of the flip-flops includes a plurality of MOS transistors with channels of the first conductivity type, located in the upper portion of the section.

According to one embodiment, the buried slabs have a thickness comprised between 1 and 2 μm and are separated from the wells by 1 to 2 μm.

According to one embodiment, the buried slabs are rectangles of more than 40 μm side length.

According to one embodiment, the buried slabs are rectangles of less than 80 μm side length.

According to one embodiment, each section has lateral dimensions comprised between 1 and 3 μm.

According to one embodiment, each section includes a biasing contact of lateral dimensions comprised between 100 and 300 nm.

According to one embodiment, the detecting circuit is suitable for triggering, in case of detection, countermeasures intended to stop an attack.

Another embodiment provides a method for protecting an above chip from an attack, including successively: a) biasing the sections and initializing the logic levels of the flip-flops; b) detecting a change in the logic level of one of the flip-flops; and c) triggering countermeasures intended to stop the attack if a change in logic level is detected in step b).

BRIEF DESCRIPTION OF THE DRAWINGS

These features and advantages, and others, will be described in detail in the following description of particular embodiments, which description is non-limiting and given with reference to the appended figures, in which.

DETAILED DESCRIPTION OF ILLUSTRATIVE EMBODIMENTS

Elements that are the same have been referenced by the same references in the various figures and, in addition, the various figures have not been drawn to scale. For the sake of clarity, only those elements that are useful to the comprehension of the described embodiments have been shown and are detailed. In particular, circuits for detecting changes in logic level are not described in detail, it being within the ability of those skilled in the art to produce such circuits on the basis of the functional indications given in the following description. Furthermore, circuits containing confidential data, which types of circuit are moreover known, are neither shown nor described in detail.

In the following description, when reference is made to qualifiers of relative position such as the terms "above", "below", "upper", "lower", etc., reference is being made to the position of the element in question in the figures in question.

Figure 1A:
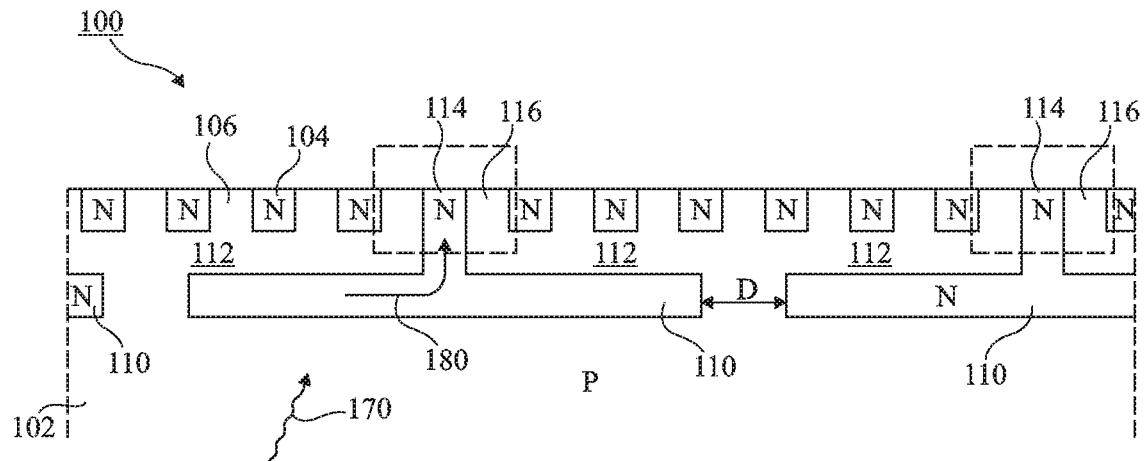
FIG. 1A is a schematic partial cross-sectional view of one embodiment of a chip protected from attacks.

FIG. 1A is a schematic partial cross-sectional view of one embodiment of a chip 100 protected from attacks.

The chip 100 includes a doped semiconductor substrate 102, for example made of silicon doped p-type. The substrate comprises wells 104 doped n-type that extend from the front face of the chip (upper face). The wells for example take the form of strips that are elongate perpendicular to the plane of the figure, as will be described with reference to FIG. 3. The n-type wells 104 are separated from one another by regions 106 of the substrate, of p type. Sensitive circuits, containing confidential information coveted by a pirate, are liable to be formed in and on the wells 104 and/or the regions 106. By way of example, the sensitive circuits (not shown) include p-channel MOS transistors in and on the wells 104, and n-channel MOS transistors in and on the regions 106.

Semiconductor slabs no doped n-type are buried in the substrate 102 under the sensitive circuits. The buried slabs are separated from the n-wells 104 by a portion 112 of the substrate, which portion is doped p-type.

A semiconductor section 114 doped n-type, which extends from the front face of the substrate 102, makes contact with each of the buried slabs 110, preferably in the center of the buried slab. The sections 114 are distinct from the wells 104 and are separated from the wells 104 by regions 116 of the substrate, of p-type.

Figure 1B:
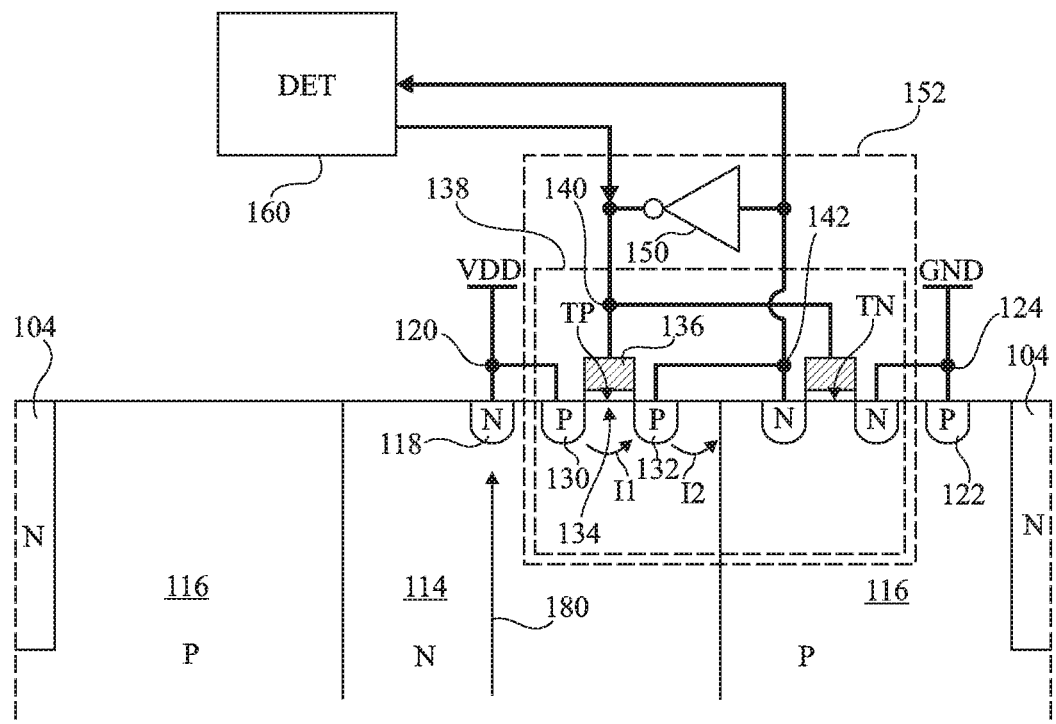
FIG. 1B is a schematic cross-sectional view, at a different scale from that of FIG. 1A, of a portion of the chip of FIG. 1A.

FIG. 1B is an enlarged schematic cross-sectional view of the upper portion of a section 114. Each section 114 is equipped with a contact redistribution zone 118, which is connected to a node 120 for applying a high bias potential VDD. A p-type region 116 surrounds the section 114 and is equipped with a contact redistribution zone 122 that is connected to a node 124 for applying a reference potential, for example a ground potential GND.

A p-channel MOS transistor TP is located in the upper portion of each n-section 114. The transistor TP includes a source zone 130 and a drain zone 132, on either side of a channel region 134 that is located under an insulated gate 136. The channel region 134 is an upper portion of the n-section 114. The source zone 130 is connected to the node 120.

The transistor TP is connected to an n-channel MOS transistor TN, which is preferably located in the region 116 surrounding the section 114, so as to form therewith an inverter 138. The interconnected gates of the transistors TP and TN correspond to the input node 140 of the inverter 138, and the interconnected drains of the transistors TP and TN correspond to the output node 142 of the inverter 138. Furthermore, an inverter 150, represented symbolically, has its input connected to the node 142 and its output connected to the node 140. The inverter 150 consists of a p-channel MOS transistor, which is preferably located in the section 114, and an n-channel MOS transistor, which is preferably located in the region 116. The assembly made up of the inverter 138 and the inverter 150 connected back-to-back forms a flip-flop 152, i.e. a logic circuit provided, when an initial logic level is applied thereto, to place itself at this logic level, and, when no logic level is applied thereto, to maintain itself at the initial logic level.

The nodes 140 and 142 are connected to a detecting circuit 160 (DET). By way of example, the detecting circuit 160 is common to the various flip-flops 152 of the various sections 114.

The detecting circuit is provided to temporarily apply to the node 140 a high logic level during a start-up phase of the chip, for example on power-up. The flip-flop 152 is thus initialized and delivers the high level to the node 140 and the low level to the node 142. During the operation of the chip, the circuit 160 applies no logic level to the node 140. The detecting circuit is provided to detect a change in the logic level of the flip-flop, for example on the node 142. In case of a change in this level, the chip takes countermeasures intended to stop an attack, for example by ceasing to operate, or by destroying the confidential data.

In operation, in the absence of attack, the logic level on the node 142 remains low, because of the normal operation of the flip-flop 152. No change in the logic level of the flip-flop 152 is detected, and the chip operates normally.

During an attempted attack, a pirate seeks to disrupt sensitive circuits located above one of the buried slabs 110, from the back face, for example with a laser 170. Because the slab no is biased to the potential VDD, it collects photogenerated electrons, and these electrons move towards the contact redistribution zone 118 (arrows 180 illustrated in FIGS. 1A and 1B). The presence of electrons in proximity to the zone 118 decreases the potential of the region 114 located under the transistor TP, which turns on (current I1). The potential of the node 142 passes to the high level, and the flip-flop changes logic level. This change in logic level triggers the implementation of the countermeasures, and the attack is countered.

The sensitive circuits located above one of the buried slabs no are thus protected from laser attacks. Furthermore, provision will possibly be made between neighboring slabs 110 for a distance D smaller than the diameter of the laser, for example the smallest possible distance, for example, smaller than 4 μm. In this way all of the sensitive circuits of the chip may be protected from laser attacks.

In case of attack by a probe brought to a potential of high negative value, the attack is detected and countered in the same way as a laser attack. Specifically, the p-n junction between the slab no and the substrate 102 enters into the avalanche breakdown regime and electrons are collected by the slab no towards the upper portion of the section.

In case of attack by a probe brought to a high positive potential, the p-n junction between the slab no and the substrate 102 turns on, and the attack is also detected and countered.

Thus, the chip is protected from various types of fault-injection attack in a manner that is particularly simple to implement. In particular, the use of the flip-flop 152 allows attacks to be countered without using analogue components such as various current sources or various resistors, which are difficult to implement and to set.

Preferably, the contact redistribution zone 118 is small, of lateral dimensions for example smaller than 300 nm, for example comprised between 100 and 300 nm. Thus, the resistance that the zone 118 opposes to the evacuation of the electrons to the potential VDD is high, thereby allowing the attack to be detected in a particularly sensitive manner. Particularly effective protection from attacks is obtained.

By way of example, the wells 104 extend as far as to a depth comprised between 1 and 2 μm. The thickness of the p-type portion 112, between the n-wells 104 and the slabs 110, is comprised between 1 and 2 μm. By way of example, the thickness of the buried slabs is comprised between 1 and 2 μm.

By way of variant, the detecting circuit may be provided to temporarily apply to the node 140, during the start-up phase, the low logic level, thus initializing the flip-flop in the inverse manner to that described above. In case of attack, the circuit 160 detects a passage to a low logic level of the node 142. Specifically, in case of a laser attack, or in case of attack with a probe of high negative potential, the presence of electrons in the section 114 turns on the bipolar transistor formed from the drain region 132 of the transistor TP, the n-section 114 and the p-region 116 (current I2), this causing a drop in the potential of the node 142.

Thus, in the above variant, the attacks are detected as they cause the passage to the low logic level of the node 142, instead of the passage to the high logic level described above. The direction of change of the logic level in fact depends on various parameters of the attack such as its duration and/or its intensity, and on the configuration of the transistor TP, of the zone 118 and of the upper portion of the section 114, in particular their shapes and their arrangement. This configuration may be chosen in order to promote one direction of change of logic level with respect to the other direction. Furthermore, although a single contact redistribution zone 118 is shown in FIG. 1B, a plurality of contact redistribution zones 118 may be used for a given section 114, in order to influence the sensitivity and the direction of the change of the logic level.

Figure 2:
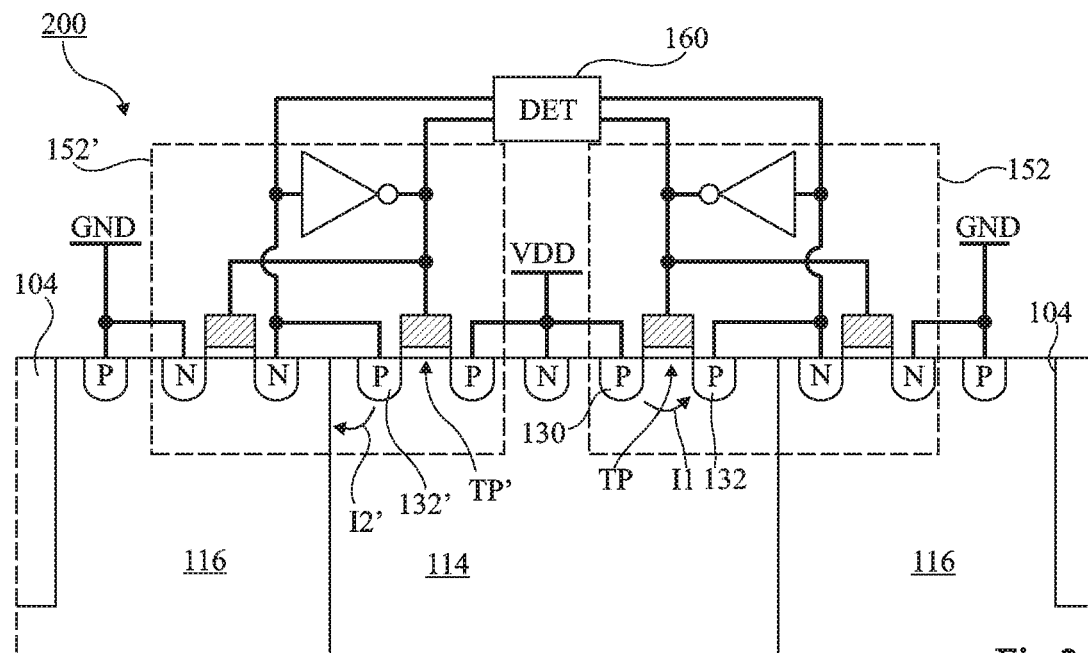
FIG. 2 is a schematic partial cross-sectional view of one embodiment of a chip protected from attacks.

FIG. 2 illustrates one embodiment of a chip 200 protected from attacks, including the same elements as the chip 100 of FIGS. 1A and 1B, which elements are arranged similarly. FIG. 2 is a cross-sectional view of the upper portion of a section 114. Apart from the same elements as the chip 100, the chip 200 includes a second flip-flop 152' that is similar to the flip-flop 152. The second flip-flop 152' in particular includes a p-channel MOS transistor TP' located in and on the upper portion of the section 114.

The detecting circuit is provided to initialize, during the start-up phase of the chip, the flip-flop 152 at the low logic level on the drain node 142 of the transistor TP, and the flip-flop 152' at the high logic level on the drain node 142' of the transistor TP'. The flip-flops 152 and 152' are thus initialized at different logic levels. The detecting circuit is provided to detect the change of logic level of the flip-flop 152 and/or of the flip-flop 152'.

In case of attack, the latter is countered, because a current I1, flowing from source of the transistor TP to its drain, causes a change in the logic level of the flip-flop 152 in a first direction, and/or because a current I2', flowing from the drain zone 132' of the transistor TP' to the region 116, causes a change in the logic level of the flip-flop 152' in a second direction. As has been mentioned, depending on the configuration of the transistors TP or TP' and on the configuration of the upper portion of the section, the changes in logic levels occur with greater sensitivity in one direction than in the other.

Because two flip-flops are used each containing one MOS transistor in the upper portion of the section and because these flip-flops are initialized at two different logic levels, the level of sensitivity of detection of the attack corresponds to the direction of the change that occurs with the greatest sensitivity. The attacks are thus detected with a particularly high sensitivity, and the level of protection is particularly high. In addition, a high protection level is obtained without choosing to favor either one of the directions of change of logic level with a particular configuration of the elements in the upper portion of the section, thereby allowing this protection level to be obtained in a particularly simple manner.

Figure 3:
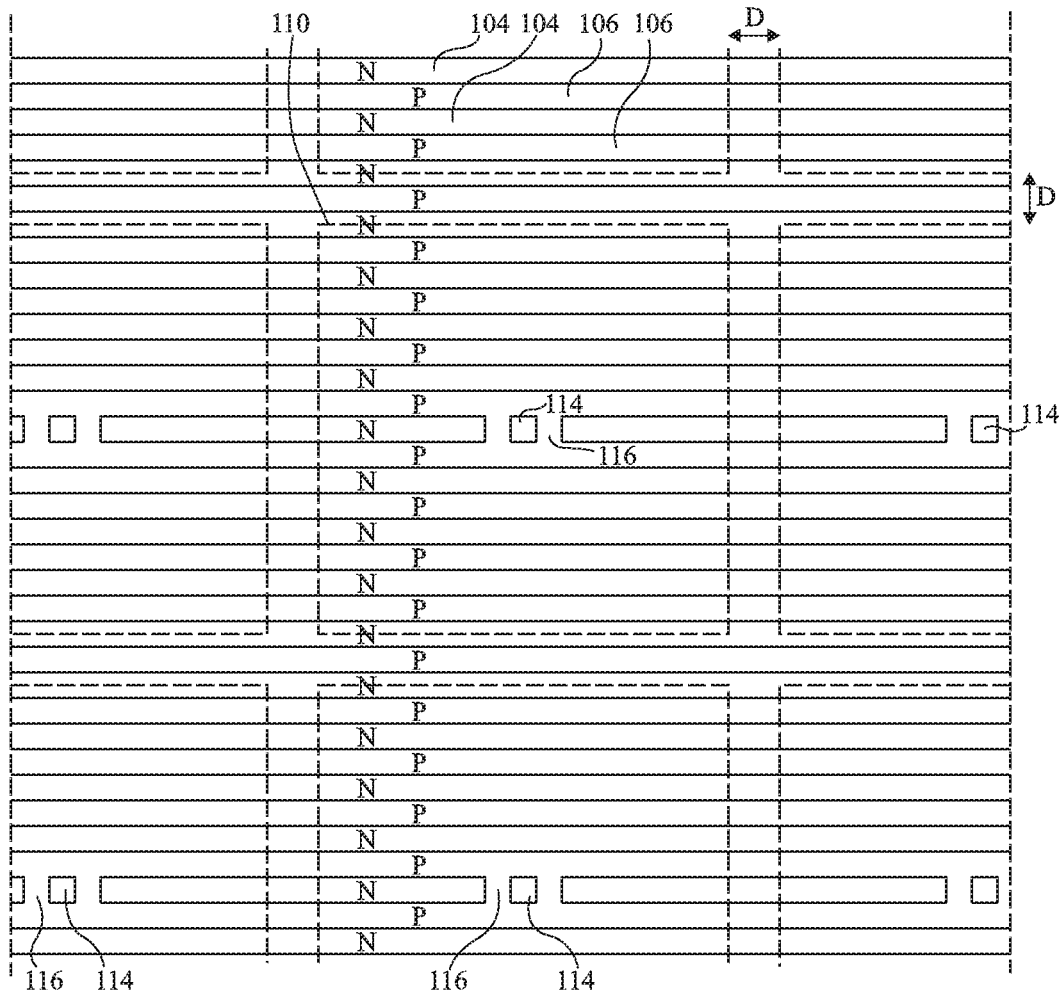
FIG. 3 is a schematic partial top view of one embodiment of a chip protected from attacks.

FIG. 3 is a schematic partial top view of a chip of the same type as the chip 100 of FIGS. 1A and 1B or as the chip 200 of FIG. 2.

The n-wells 104 and the p-regions 106 form alternated parallel strips above the buried slabs no. The sensitive circuits (not shown) are for example logic circuits including, as mentioned above, p-channel MOS transistors and n-channel MOS transistors located in and on the neighboring strips 104 and 106. By way of example, the widths of the strips are comprised between 1 and 3 µm. By way of example, the buried slabs are rectangular, preferably square. The dimensions of the sides of the buried slabs are for example comprised between 40 and 80 µm. The buried slabs are preferably regularly arranged.

As mentioned above, the sections 114 are preferably located in the center of the slabs. The sections 114, surrounded by the regions 116, are located in the location of strips 104 that are interrupted in order to leave space therefor. The sections 114 preferably have, seen from above, a square shape of the same dimensions as the width of the strips 104, the shape being aligned with the strips 104.

According to one advantage, the area of the chip occupied by the protecting elements is particularly small. Specifically, the protecting elements associated with a single one of the sections 114 allow all the sensitive circuits located above the buried slab no in question to be protected, the latter for example being of more than 40 µm side length.

According to another advantage, because the dimensions of the sides of the slabs are for example smaller than 80 µm, and because the sections 114 are positioned centrally on the buried slabs, any attacks are detected rapidly. Specifically, in case of attack, the electrons collected by the slab no in question only have a short distance to travel to reach the upper portion of the section 114.

According to another advantage, because the sections 114 are located in alignment with the strips, and because flip-flops 152 are used, the protecting device is particularly simple to produce at the same time as the logic circuits of the chip. Specifically, flip-flops are logic circuits including n-channel and p-channel MOS transistors that may be produced in and on the sections 114 and the regions 116 at the same time and in the same manner as the MOS transistors of the logic circuits of the chip.

Particular embodiments have been described. Various variants and modifications will appear obvious to those skilled in the art. In particular, although one particular type of flip-flop has been described for a section 114, any type of flip-flop including a p-channel MOS transistor the channel region of which is a portion of the section 114 may be used, this flip-flop being such that a change in the on/off state of the transistor causes the logic level of the flip-flop to change. Furthermore, the flip-flop may include a plurality of p-channel MOS transistors the channel regions of which are portions of the section 114.

In addition, although the chip 100 includes one flip-flop per section 114 and although the chip 200 includes two flip-flops per section 114, each section 114 may be provided with more than two flip-flops, each flip-flop including, just like the flip-flops of the chips 100 and 200, at least one transistor in and on the section 114. The detecting circuit may then be suitable for detecting, for one of the sections 114, a change in the logic level of a majority of the flip-flops. Thus, the risk that a single of the flip-flops will cause, because it has too high a sensitivity, the countermeasures to be triggered in the absence of an attack is eliminated.

Although the described embodiments include a plurality of buried slabs 110, each connected to one section 114, it will be noted that it is possible to provide a single buried slab under all of the sensitive circuits, the single slab being connected to a single section 114. Furthermore, although rectangular slabs of less than 80 µm side length have been described, the slabs may have dimensions larger than 80 µm, for example of more than 1 mm. In particular, if a single buried slab is provided, the slab may be rectangular and of more than 1 mm side length.

Moreover, other embodiments, corresponding to the embodiments described but with the n and p conductivity types and the high and low levels of the potentials exchanged, are possible.

What is claimed is:

1. An electronic chip comprising:
   a doped semiconductor substrate of a first conductivity type, the doped semiconductor substrate having a first surface;
   a plurality of wells of a second conductivity type disposed on the first surface of the doped semiconductor substrate, wherein the second conductivity type is opposite the first conductivity type;
   a plurality of slabs of the second conductivity type buried under the wells and separated from the wells to form a plurality of buried slabs;
   a plurality of biasable sections of the second conductivity type extending from the first surface of the doped semiconductor substrate to respective buried slabs of the plurality of buried slabs;
   a plurality of flip-flops, each flip-flop of the plurality of flip-flops having a first metal-oxidesemiconductor (MOS) transistor, each first MOS transistor having a channel of the first conductivity type and disposed in a first portion of a respective biasable section of the plurality of biasable sections; and
   a detector configured to detect a change in a logic level of one of the plurality of flip-flops.

2. The electronic chip of claim 1, wherein the detector is configured to initialize the plurality of flip-flops to a first logic level, and detect a passage of one of the plurality of flip-flops to a second logic level.

3. The electronic chip of claim 2, wherein the first logic level is low and the second logic level is high.

4. The electronic chip of claim 2, further comprising a plurality of additional flip-flops having a second MOS transistor, each second MOS transistor having a channel of the first conductivity type and disposed in the first portion of the respective biasable section of the plurality of biasable sections, the detector further configured to initialize the plurality of additional flip-flops to the second logic level, and detect a passage of one of the additional flip-flops to the first logic level.

5. The electronic chip of claim 1, further comprising circuit elements disposed over the first surface of the doped semiconductor substrate.

6. The electronic chip of claim 1, wherein each first portion of each biasable section comprises more than one flip-flops, and each of the more than one flip-flops has a MOS transistor with a channel of the first conductivity type.

7. The electronic chip of claim 6, wherein the detector is further configured to detect a change in the logic level of a majority of the more than one flip-flops.

8. The electronic chip of claim 1, wherein each buried slab has a thickness between 1 µm and 2 µm and is separated from the wells by 1 µm to 2 µm.

9. The electronic chip of claim 1, wherein each buried slab is a rectangle of more than 40 µm side length.

10. The electronic chip of claim 1, wherein each buried slab is a rectangle of less than 80 µm side length.

11. The electronic chip of claim 1, wherein each biasable section has lateral dimensions between 1 µm and 3 µm.

12. The electronic chip of claim 1, wherein each biasable section comprises a biasing contact of lateral dimensions between 100 nm and 300 nm.

13. The electronic chip of claim 1, wherein the detector is configured to trigger countermeasures intended to stop a fault injection attack on the electronic chip after the detector detects a change in the logic level of one of the plurality of flip-flops.

14. The electronic chip of claim 13, wherein the electronic chip stores data, and the countermeasures comprises disabling the electronic chip or destroying the data.

15. The electronic chip of claim 1, wherein the first conductivity type is p-type and the second conductivity type is n-type.

16. A method comprising:
   biasing a semiconductor region that extends from a first surface of a doped semiconductor substrate to a buried slab, the doped semiconductor substrate having a first conductivity type and the semiconductor region and the buried slab having a second conductivity type opposite the first conductivity type, the buried slab being buried under wells and separated from the wells;
   detecting a change in a logic level of a flip-flop comprising a first transistor disposed in a first portion of the semiconductor region; and
   after detecting the change in the logic level of the flip-flop, triggering countermeasures.

17. The method of claim 16, wherein the triggering countermeasures comprises disabling a circuit disposed over the doped semiconductor substrate.

18. The method of claim 16, wherein the triggering countermeasures comprises destroying data stored in a circuit electrically coupled to a detector used to detect the change in logic level.

19. The method of claim 16, further comprising:
   receiving laser pulses; and
   changing the logic level of the flip-flop after the receiving laser pulses.

20. The method of claim 16, further comprising:
   receiving a high voltage; and
   changing the logic level of the flip-flop after the receiving the high voltage.

21. The method of claim 20, wherein the high voltage is a voltage higher than 50 V.

22. The method of claim 16, further comprising applying a voltage to the flip-flop during power-up to initialize the flip-flop to a first level.

23. A device comprising:
   a substrate of a first conductivity type, the substrate having a first surface;
   a plurality of well regions of a second conductivity type extending from the first surface of the substrate into the substrate;
   a buried slab of the second conductivity type disposed under the plurality of well regions;
   a first semiconductor section having the second conductivity type and extending from the first surface of the substrate to the buried slab, the first semiconductor section being surrounded by a second semiconductor section of the first conductivity type;
   a first transistor disposed over the first semiconductor section;
   a second transistor disposed over the second semiconductor section, the second transistor electrically coupled to the first transistor to form a first inverter;
   a second inverter electrically coupled to the first inverter to form a first flip-flop; and
   a detector electrically coupled to the first flip-flop.

24. The device of claim 23, wherein the first semiconductor section extends from the first surface of the substrate to a center of the buried slab, wherein the center comprises a mid-point between opposite edges of the buried slab in a direction parallel to the first surface of the substrate.

25. The device of claim 23, wherein the detector is configured to initialize the first flip-flop during a startup-phase to a first level and detect a change of the first flip-flop from the first level to a second level.

* * * * *